(12) United States Patent
Wilkinson et al.

(10) Patent No.: US 10,276,069 B1
(45) Date of Patent: Apr. 30, 2019

(54) COMPOSITE LABEL AND METHOD OF MAKING

(71) Applicant: Electronic Imaging Services, Inc, Little Rock, AR (US)

(72) Inventors: Michael Wilkinson, Overland Park, KS (US); David Adler, Interlaken, NJ (US)

(73) Assignee: ELECTRONIC IMAGING SERVICES, INC., Little Rock, AZ (US)

( * ) Notice: Subject to any disclaimer, the term of this patent is extended or adjusted under 35 U.S.C. 154(b) by 60 days.

(21) Appl. No.: 14/937,201

(22) Filed: Nov. 10, 2015

Related U.S. Application Data

(60) Provisional application No. 62/077,368, filed on Nov. 10, 2014.

(51) Int. Cl.
| | |
|---|---|
| *G01N 33/487* | (2006.01) |
| *G09F 3/02* | (2006.01) |
| *B32B 3/26* | (2006.01) |
| *B32B 37/16* | (2006.01) |
| *B32B 37/12* | (2006.01) |
| *B32B 7/14* | (2006.01) |
| *B32B 38/04* | (2006.01) |
| *B32B 38/00* | (2006.01) |
| *B32B 29/00* | (2006.01) |
| *B29C 65/48* | (2006.01) |
| *B29C 65/00* | (2006.01) |
| *B29K 711/12* | (2006.01) |
| *B29L 31/00* | (2006.01) |

(52) U.S. Cl.
CPC ............... *G09F 3/02* (2013.01); *B29C 65/48* (2013.01); *B29C 66/0326* (2013.01); *B29C 66/43* (2013.01); *B29C 66/7486* (2013.01); *B32B 3/266* (2013.01); *B32B 7/14* (2013.01); *B32B 29/002* (2013.01); *B32B 37/1292* (2013.01); *B32B 37/16* (2013.01); *B32B 38/04* (2013.01); *B32B 38/145* (2013.01); *B29K 2711/12* (2013.01); *B29L 2031/744* (2013.01); *B32B 2038/047* (2013.01); *B32B 2317/12* (2013.01); *B32B 2519/00* (2013.01)

(58) Field of Classification Search
CPC .................................................. B29C 66/0326
USPC ......................................................... 428/43
See application file for complete search history.

(56) References Cited

U.S. PATENT DOCUMENTS 6,016,618 A * 1/2000 Attia ..................... B42D 15/00
156/289

\* cited by examiner

*Primary Examiner* — Brent T O'Hern
(74) *Attorney, Agent, or Firm* — Morgan, Lewis & Bockius LLP

(57) ABSTRACT

A method for making labels comprising providing a plastic substrate layer and a paper substrate layer. The paper substrate layer comprises a printed display information sheet, wherein the printed display information sheet comprises a plurality of display information tags arranged in an array. The plastic substrate layer is coupled to each of the rows of display information tags within a first portion of the display information tags to form a composite substrate row. A first line of perforations is cut into a width of the composite substrate at one or more first spaced intervals, a length of the first spaced intervals being defined by a length of the display information tags. A second line of perforations is cut into a width of the composite substrate at one or more second spaced intervals, a length of the second spaced intervals being defined by a height of the display information tags.

7 Claims, 5 Drawing Sheets

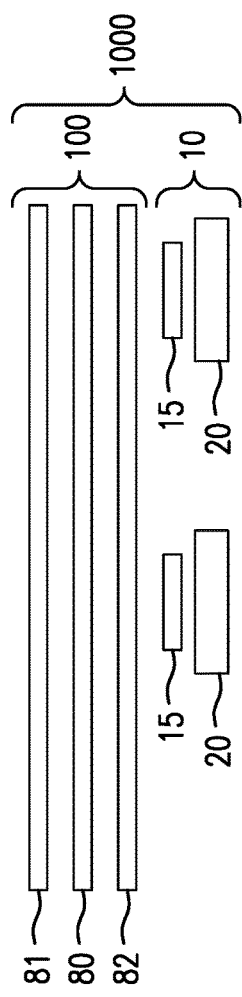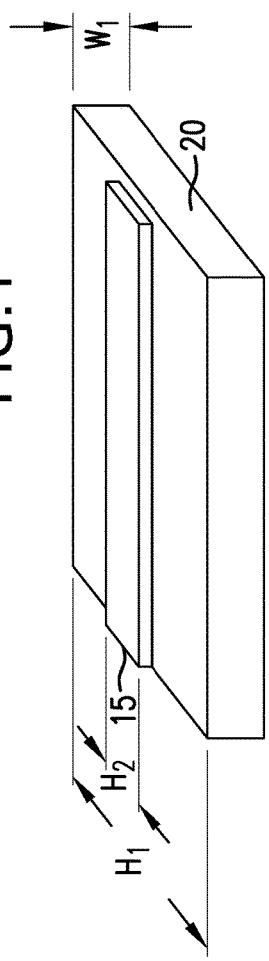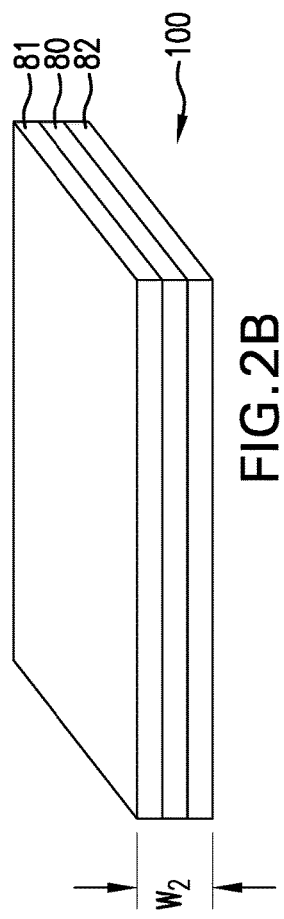

COMPOSITE LABEL AND METHOD OF MAKING

CROSS-REFERENCE TO RELATED APPLICATIONS

This application claims the benefit of U.S. Provisional Patent Application No. 62/077,368 filed Nov. 10, 2014, entitled "Cool-Clips Label", which is incorporated by reference herein in its entirety.

FIELD OF THE INVENTION

The present invention generally relates to labels for a shelf edge. In particular embodiments, the invention relates to labels suitable for use in a cold environment, such as the refrigerated and frozen departments of a grocery store, and methods for making the same.

BACKGROUND OF THE INVENTION

Traditional pressure sensitive adhesive tags (also referred to herein as labels) do not adhere well to the shelf edge in the refrigerated and frozen food departments of a store due to the moisture and cold (e.g., sub-zero) temperatures present in such environments. To overcome this problem, a tag is adhered to a plastic chip, which is clipped into the molding on the top and bottom portions of the shelf edge. The process for adhering a tag to a plastic chip in this manner is manual-labor intensive.

BRIEF SUMMARY OF THE INVENTION

One embodiment includes a method of making a plurality of labels comprising providing a plastic substrate layer; providing a paper substrate layer, wherein the paper substrate layer comprises a printed display information sheet, wherein the printed display information sheet comprises a plurality of display information tags arranged in an array, the array having at least two columns and at least two rows of display information tags, wherein each of the display information tags comprises a first portion and a second portion; coupling the plastic substrate layer to each of the rows of display information tags within the first portion of the display information tags to form a composite substrate row; cutting a first line of perforations into a width of the composite substrate at one or more first spaced intervals, a length of the first spaced intervals being defined by a length of each of the display information tags; and cutting a second line of perforations into a width of the composite substrate at one or more second spaced intervals, a length of the second spaced intervals being defined by a height of each of the display information tags.

In certain embodiments of the method, each of the composite substrate rows comprises a first portion that includes the first portion of the display information tag and a second portion that includes the second portion of the display information tag, and wherein cutting the perforations comprises cutting first perforations in the first portion of the composite substrate row and cutting second perforations in the second portion of the composite substrate row, wherein the first perforations are larger in height than the second perforations. In some embodiments, the first perforations are approximately 0.5650 inches in height. In other embodiments, the second perforations are approximately 0.04 inches in height. In still other embodiments, a length of the first spaced intervals is in a range of 1 inch to 1¼ inch.

A further embodiment includes a method of making a sheet of connected labels comprising providing a paper substrate having a plurality of display information tags arranged in an array, the array having at least two columns of display information tags, wherein each of the display information tags comprises a first portion and a second portion; coupling, directly or indirectly, a strip of composite material to the paper substrate to form at least one composite substrate row containing the first portion of the display information tags and at least one paper substrate row containing the second portion of the display information tags; and cutting a plurality of perforations through the at least one paper substrate row and the at least one composite substrate row between each adjacent display information tag to define individual labels.

In certain embodiments of the method, a height of each perforation extending through the at least one composite substrate row is larger than a height of each perforation extending through the at least one paper substrate row.

A further embodiment is directed to a sheet of labels comprising at least one first strip of a first material extending in a first direction and having a bottom surface; at least one second strip of a second material extending in the first direction and having a top surface coupled with the bottom surface of the at least one first strip, the second material being stiffer than the first material; and a plurality of perforations forming a plurality of perforated lines extending through the at least one first strip and the at least one second strip in a second direction generally perpendicular to the first direction.

In certain embodiments of the sheet of labels, the plurality of perforations extending through the at least one second strip are longer than the plurality of perforations extending through the at least one first strip.

A further embodiment is directed to a method of making a plurality of labels comprising applying an adhesive strip to a top surface of a plastic substrate to form a plastic substrate layer; printing display information on a top surface of a paper substrate; affixing a first layer of lamination material to a bottom surface of the paper substrate and affixing a second layer of lamination material to the top surface of the paper substrate to form a display information sheet, wherein the display information sheet comprises a plurality of display information tags arranged in an array, the array having at least two columns and at least two rows of display information tags, wherein each of the display information tags comprises a first portion and a second portion; for each row of display information tags, affixing the adhesive strip to the first layer of the lamination material within the first portion of the display information tags in the row to form a composite substrate row; cutting a first line of perforations into a width of the composite substrate at one or more first spaced intervals, a length of the first spaced intervals being defined by a length of each of the display information tags; and cutting a second line of perforations into a width of the composite substrate at one or more second spaced intervals, a length of the second spaced intervals being defined by a height of each of the display information tags.

In certain embodiments of the method, each of the composite substrate rows comprises a first portion that includes the first portion of the display information tag and a second portion that includes the second portion of the display information tag; and wherein cutting the first line of perforations comprises cutting first perforations in the first portion of the composite substrate row and cutting second perforations in the second portion of the composite substrate row, wherein the first perforations are larger in height than the second perforations. In some embodiments, the first perforations are approximately 0.5650 inches in height. In other embodiments, the second perforations are approximately 0.04 inches in height. In still further embodiments, a length of the first spaced intervals is in a range of 1 inch to 1¼ inch. In other embodiments, a height of the adhesive strip is approximately centered in a height of the plastic substrate. In other embodiments, a height of the adhesive strip is in the range of ½ inch to ⅝ inch. In other embodiments, a height of the plastic substrate is about 1¼ inch. In further embodiments, a width of the plastic substrate is in the range of 0.0007 inch to 0.001 inch.

BRIEF DESCRIPTION OF THE SEVERAL VIEWS OF THE DRAWINGS

The foregoing summary, as well as the following detailed description of embodiments of the composite label and method, will be better understood when read in conjunction with the appended drawings of an exemplary embodiment. It should be understood, however, that the invention is not limited to the precise arrangements and instrumentalities shown.

In the drawings:

FIG. 1 is a side and exploded view of a composite substrate comprising a paper substrate layer and a plastic substrate layer in accordance with an exemplary embodiment of the present invention;

FIG. 2A is a perspective view of the plastic substrate layer shown in FIG. 1;

FIG. 2B is a perspective view of the paper substrate layer shown in FIG. 1;

DETAILED DESCRIPTION OF THE INVENTION

Figure 3:
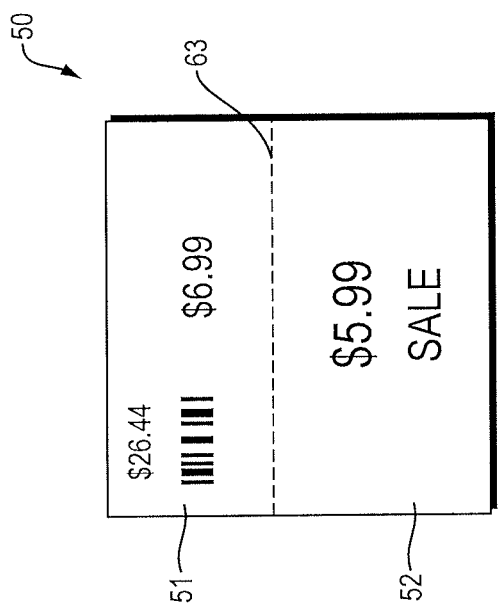
FIG. 3 is a top view of an individual label in accordance with an exemplary embodiment of the present invention.

Described herein are labels that are suitable for use in a cold environment, such as the refrigerated and frozen food departments of a store, and methods of making the same. Such labels are similar to traditional labels in terms of the paper, laminate and certain aspects of the manufacturing process but, in place of a pressure sensitive adhesive tape used to secure the label to the shelf, a plastic substrate to which adhesive has been affixed is secured to the paper tag, in exemplary embodiments. New processes are required to automate the process of coupling the plastic substrate to the paper tag, as described more fully herein.

FIG. 1 is a side and exploded view of a composite substrate 1000 comprising a paper substrate layer 100 and a plastic substrate layer 10, in accordance with an exemplary embodiment of the present invention. Paper substrate layer 100, in certain exemplary embodiments, comprises a printed display information sheet 80, which includes display information printed thereon (e.g., bar codes, prices, unit prices, sale information, advertisements), a first layer of lamination material 82 and a second layer of lamination material 81. Plastic substrate layer 10, in certain exemplary embodiments, comprises an adhesive strip 15 and a plastic substrate 20. Paper substrate layer 100 is formed of a first material (e.g., paper which, in one embodiment, is laminated on the top and bottom) and plastic substrate layer 10 is formed of a second material (e.g., plastic). The second material is stiffer than the first material. The second material may be supplied in a roll form for coupling to the first material. In some embodiments, paper substrate layer 100 is not formed from paper laminated on the top and bottom. For example, in other embodiments, paper substrate layer 100 is formed from paper alone (no laminate) or from a vinyl material (or poly, foil etc.) with display information printed on the vinyl material.

FIG. 2A is a perspective view of the plastic substrate layer 10 in accordance with an exemplary embodiment of the present invention. Plastic substrate layer 10 includes plastic substrate 20 with adhesive strip 15 affixed to the top. Adhesive strip 15 is used to couple plastic substrate 20 to paper substrate layer 100. In the exemplary embodiment, adhesive strip 15 is adhered to the bottom side of plastic substrate layer 10, e.g., first layer of lamination material 82. Plastic substrate layer 10 is associated with a width $W_1$. $W_1$ is in the range of 0.0007 to 0.001 inches, in an exemplary embodiment. The plastic substrate 20 is associated with a height $H_1$ and the adhesive strip 15 is associated with a height $H_2$. $H_1$ is, in an exemplary embodiment, about 1¼ inches. $H_2$ is, in an exemplary embodiment, ½ to ⅝ inches. The adhesive strip 15 is substantially centered within the height of the plastic substrate $H_1$, in an exemplary embodiment.

FIG. 2B is a perspective view of the paper substrate layer 100. Paper substrate layer 100 is associated with a width $W_2$.

While in the illustrated embodiment plastic substrate layer 10 is coupled to the underside of paper substrate layer 100 using adhesive strip 15, other methods of coupling plastic substrate layer 10 to paper substrate layer 100 are possible.

Figure 4A:
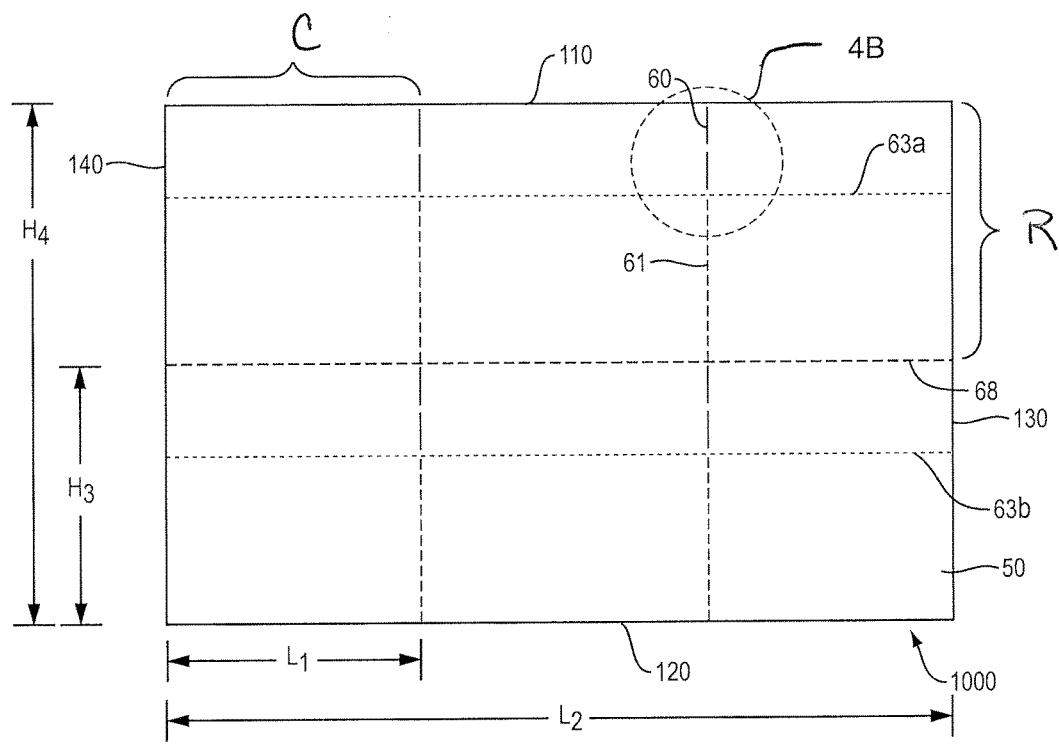
FIG. 4A is a top view of a sheet of labels in accordance with an exemplary embodiment of the present invention.

FIG. 4A is a top view of the composite substrate 1000 in accordance with an exemplary embodiment of the present invention. Composite substrate 1000 includes at least two rows and at least two columns and includes a top edge 110, a bottom edge 120, left edge 140 and right edge 130. Composite substrate 1000 comprises a plurality of individual display information tags 50 arranged in an array of rows R and columns C. The individual display information tags 50 are formed from composite substrate 1000 by lines of perforations 68 cut along the rows and lines of perforations 60 and 61 cut along the columns, as described in more detail with reference to FIGS. 4B and 5B. Each display information tag 50 is associated with a height $H_3$ and length $L_1$. In an exemplary embodiment, $L_1$ is approximately 1 inch to 1¼ inch. Each column is associated with a height $H_4$ and a length, the length of the column coinciding with the length of a single display information tag 50, $L_1$. Each row is associated with a length $L_2$, which is the length of composite substrate 1000, and a height, which is the height of a single display information tag $H_3$. In production, composite substrate 1000, in some embodiments, is cut from a larger sheet of composite material (i.e., knife cuts in the larger sheet of material result in clean edges, namely top edge 110, bottom edge 120, left edge 140 and rights edge 130). A top edge of plastic substrate layer 10 is generally co-extensive with top edge 110.

FIG. 3 is a top view of an individual display information tag 50 in accordance with an exemplary embodiment of the present invention. Display information tag 50 includes a first portion 51 and a second portion 52. First portion 51 and second portion 52 may be separated by a line of perforations 63, in some embodiments. As shown in FIG. 4A, each row of composite substrate 100 may include a line of perforations 63a and 63b. In other embodiments, there is no physical indication of separation (e.g., no line of perforations 63) between first portion 51 and second portion 52. Each display information tag 50 may include printed indicia (e.g., printed on printed display information sheet 80), including a bar code, price, unit price, advertisements or sale information. In exemplary embodiments, the bar code, price and unit price is contained within first portion 51 and advertisements and sale information is contained within second portion 52. However, other configurations are within the scope of the present invention.

Figure 4B:
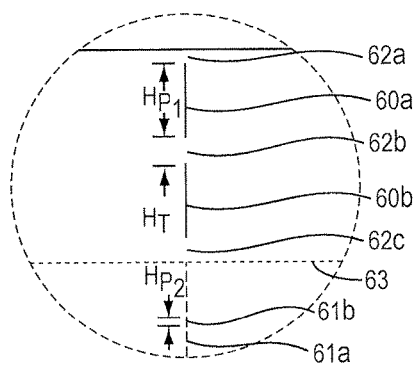
FIG. 4B is an enlarged view of a portion of FIG. 4A.

FIG. 4B is an enlarged view of a portion of FIG. 4A which illustrates the perforations 60a and 60b and 61a and 61b cut between adjacent columns of composite substrate 1000. Perforations 60a and 60b are cut through the width of composite substrate (i.e., $W_1+W_2$) between adjacent columns of composite substrate 1000 in the sections that include plastic substrate layer 10. Perforations 61a and 61b . . . 61n are cut through the width of composite substrate (i.e., $W_2$) between adjacent columns in the sections that do not include plastic substrate layer 10. Between perforations, ties 62a, 62b and 62c remain in the sections of composite substrate 1000 that include plastic substrate layer 10 (as well in the portion of composite substrate 1000 that does not include plastic substrate layer 10 between perforations 61a, 61b . . . 61n, although the ties between perforations 61a, 61b . . . 61n are not labeled in FIG. 4A or 4B), to hold composite substrate 1000 together prior to manual separation. In order to separate composite substrate 1000 into display information tags 50, it is necessary to manually separate composite substrate 1000 at perforations 60a, 60b, 61a, 61b . . . 61n, as well as along perforation line 68. In certain exemplary embodiments, a height of each of perforations 60a and 60b ($H_{P1}$) is approximately 0.5650 inches; a height of each of perforations 61a, 61b . . . 61n ($H_{P2}$) is approximately 0.040 inches; and a height ($H_T$) of each of ties 62a, 62b, 62c is approximately 0.40 inches, or may be 0.02 inches in certain embodiments.

In some embodiments, in order to achieve the perforations, there could be a full cut in the plastic material and perforations in the paper portion (referred to as a slit over perf). Perforations 60a and 60b can be full or solid cuts. Ties 62a, 62b and 62c may be included in the cuts of section plastic substrate layer 10 for strength of the composite substrate 1000 for manufacturing and delivery purposes.

Figure 5A:
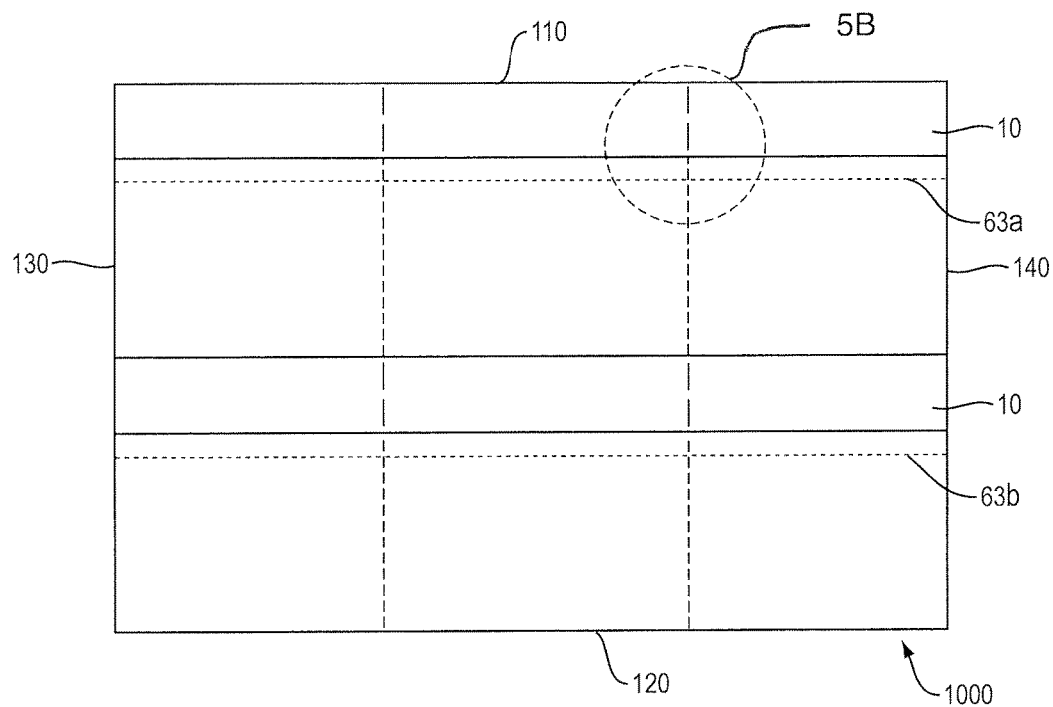
FIG. 5A is a bottom view of the sheet of labels.

FIG. 5A is a bottom view of the composite substrate 1000. In this view, plastic substrate layer 10 is visible, having been coupled to the underside of paper substrate layer 100. In some embodiments, there is a small gap (e.g., 1/16 inches; gap not shown in FIG. 5A) between the top edge 110 of the paper substrate layer 100 and the top edge of the plastic substrate layer 10. Perforation 68 is included in the paper substrate layer 100 for purposes of separating of the individual labels 50.

Figure 5B:
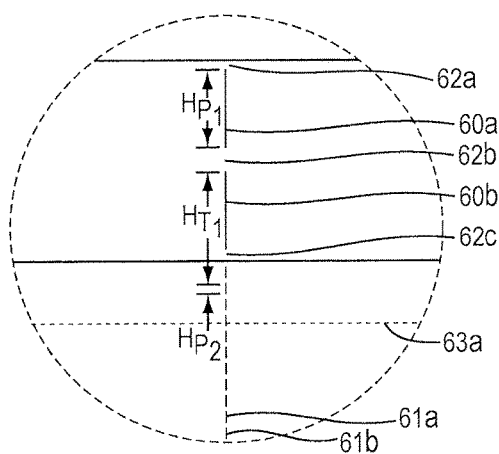
FIG. 5B is an enlarged view of a portion of FIG. 5A.

FIG. 5B is an enlarged view of a portion of FIG. 5A and is similar to FIG. 4B except that plastic substrate layer 10 is visible and, as described above, in some embodiments, a small portion (e.g., 1/16 inches of paper substrate layer 100) extends above plastic substrate layer 10, though this portion/gap is not shown.

Figure 6:
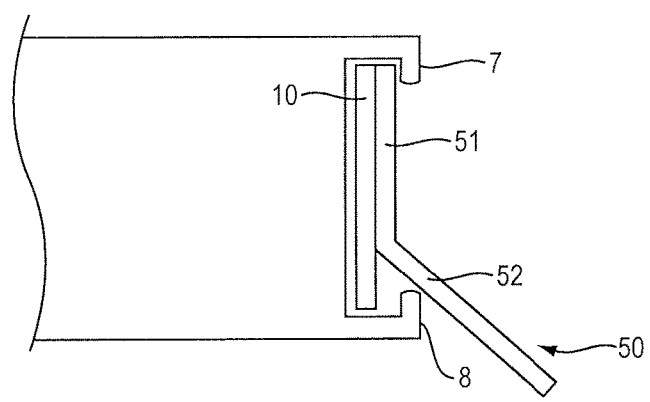
FIG. 6 is a side view of an individual label clipped into a shelf edge in accordance with an exemplary embodiment of the present invention.

FIG. 6 is a side view of a display information tag 50 clipped into a shelf edge 5, in accordance with an exemplary embodiment of the present invention. First portion 51 of display information tag 50 may be contained within the area of the shelf edge and second portion 52 of display information tag 50 hangs down from the shelf edge. Plastic substrate layer 10 may clip into the top flange 7 and bottom flange 8 of the shelf edge. In one embodiment as shown in FIG. 6, plastic substrate layer 10 is coupled to display information tag 50 only within first portion 51 of display information tag 50 to form a composite substrate.

It will be appreciated by those skilled in the art that changes could be made to the exemplary embodiments shown and described above without departing from the broad inventive concepts thereof. It is understood, therefore, that this invention is not limited to the exemplary embodiments shown and described, but it is intended to cover modifications within the spirit and scope of the present invention as defined by the claims. For example, specific features of the exemplary embodiments may or may not be part of the claimed invention and various features of the disclosed embodiments may be combined. Unless specifically set forth herein, the terms "a," "an" and "the" are not limited to one element but instead should be read as meaning "at least one."

It is to be understood that at least some of the figures and descriptions of the invention have been simplified to focus on elements that are relevant for a clear understanding of the invention, while eliminating, for purposes of clarity, other elements that those of ordinary skill in the art will appreciate may also comprise a portion of the invention. However, because such elements are well known in the art, and because they do not necessarily facilitate a better understanding of the invention, a description of such elements is not provided herein.

Further, to the extent that the methods of the present invention do not rely on the particular order of steps set forth herein, the particular order of the steps should not be construed as limitation on the claims. Any claims directed to the methods of the present invention should not be limited to the performance of their steps in the order written, and one skilled in the art can readily appreciate that the steps may be varied and still remain within the spirit and scope of the present invention.

We claim:

1. A method of making a plurality of labels comprising:
   (a) providing a plastic substrate layer;
   (b) providing a paper substrate layer,
   wherein the paper substrate layer comprises a printed display information sheet, wherein the printed display information sheet comprises a plurality of display information tags arranged in an array, the array having at least two columns and at least two rows of display information tags, wherein each of the display information tags comprises a first portion and a second portion;
   (c) coupling the plastic substrate layer to each of the rows of display information tags only within the first portion of the display information tags to form a composite substrate; and
   (d) cutting a first line of perforations into a width of the composite substrate at one or more first spaced intervals, a length of the first spaced intervals being defined by a length of each of the display information tags; and
   (e) cutting a second line of perforations into a width of the composite substrate at one or more second spaced intervals, a length of the second spaced intervals being defined by a height of each of the display information tags.

2. The method of claim 1, wherein each of the composite substrate rows comprises a first portion that includes the first portion of the display information tag and a second portion that includes the second portion of the display information tag, and wherein cutting the perforations comprises cutting first perforations in the first portion of the composite substrate row and cutting second perforations in the second portion of the composite substrate row, wherein the first perforations are larger in height than the second perforations.

3. The method of claim 2, wherein the first perforations are approximately 0.5650 inches in height.

4. The method of claim 2, wherein the second perforations are approximately 0.04 inches in height.

5. The method of claim 1, wherein a length of the first spaced intervals is in a range of 1 inch to 1¼ inch.

6. A method of making a sheet of connected labels comprising:

providing a paper substrate having a plurality of display information tags arranged in an array, the array having at least two columns of display information tags, wherein each of the display information tags comprises a first portion and a second portion;

coupling, directly or indirectly, a strip of composite material to the paper substrate only within the first portion of the display information tags to form at least one composite substrate row containing the first portion of the display information tags and at least one paper substrate row containing the second portion of the display information tags; and cutting a plurality of perforations through the at least one paper substrate row and the at least one composite substrate row between each adjacent display information tag to define individual labels.

7. The method of claim 6, wherein a height of each perforation extending through the at least one composite substrate row is larger than a height of each perforation extending through the at least one paper substrate row.

\* \* \* \* \*